United States Patent [19]
Kamiguchi et al.

[11] Patent Number: 6,066,276
[45] Date of Patent: *May 23, 2000

[54] INJECTION SPEED EDITING/SETTING METHOD FOR AN INJECTION MOLDING MACHINE

[75] Inventors: Masao Kamiguchi; Noriaki Neko; Kouzo Inoue, all of Oshino-mura, Japan

[73] Assignee: Fanuc Ltd., Yamanashi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/392,945

[22] PCT Filed: Jul. 5, 1994

[86] PCT No.: PCT/JP94/01095

§ 371 Date: Mar. 6, 1995

§ 102(e) Date: Mar. 6, 1995

[87] PCT Pub. No.: WO95/01865

PCT Pub. Date: Jan. 19, 1995

[30] Foreign Application Priority Data

Jul. 8, 1993 [JP] Japan .................................. 5-192697

[51] Int. Cl.[7] ............................ B29C 43/14; B29C 43/58
[52] U.S. Cl. ........................ 264/40.7; 425/145; 425/150
[58] Field of Search ........................ 264/40.7; 425/145, 425/150

[56] References Cited

U.S. PATENT DOCUMENTS

| 4,806,089 | 2/1989 | Neko ........................................ 425/145 |
| 4,881,186 | 11/1989 | Tsuboi et al. .......................... 425/145 |
| 4,968,462 | 11/1990 | Hara ........................................ 425/145 |
| 5,030,395 | 7/1991 | Kamiguchi et al. ..................... 425/145 |
| 5,031,127 | 7/1991 | Fujita et al. ............................ 425/145 |
| 5,062,784 | 11/1991 | Inaba et al. ............................. 425/145 |
| 5,470,218 | 11/1995 | Hillman et al. ......................... 425/145 |
| 5,514,311 | 5/1996 | Shimizu et al. ......................... 425/145 |

FOREIGN PATENT DOCUMENTS

| 0 216 939 | 4/1987 | European Pat. Off. . |
| 0 264 453 | 4/1988 | European Pat. Off. . |
| 0 327 899 | 6/1990 | European Pat. Off. . |
| 0 436 732 | 7/1991 | European Pat. Off. . |
| 0 531 532 | 3/1993 | European Pat. Off. . |
| 60-108155 | 6/1985 | Japan . |
| 63-130326 | 6/1988 | Japan . |

*Primary Examiner*—Jan Ludlow
*Attorney, Agent, or Firm*—Staas & Halsey, LLP

[57] ABSTRACT

The correlation between an injection stage and an injection speed initially set in an injection condition file is graphically displayed on a display screen. A modification section is set by assigning a starting point and an end point on the graph. Then, the shape of a segment which connects the starting point and the end point is selected and assigned, out of those of a straight line and a circular arc. Thus, a section between the two points constitutes one new injection stage. In this new injection stage, moreover, the injection speed is not always a constant value, and can be optionally set so that it linearly increases or decreases or changes along a circular arc in this section.

9 Claims, 13 Drawing Sheets

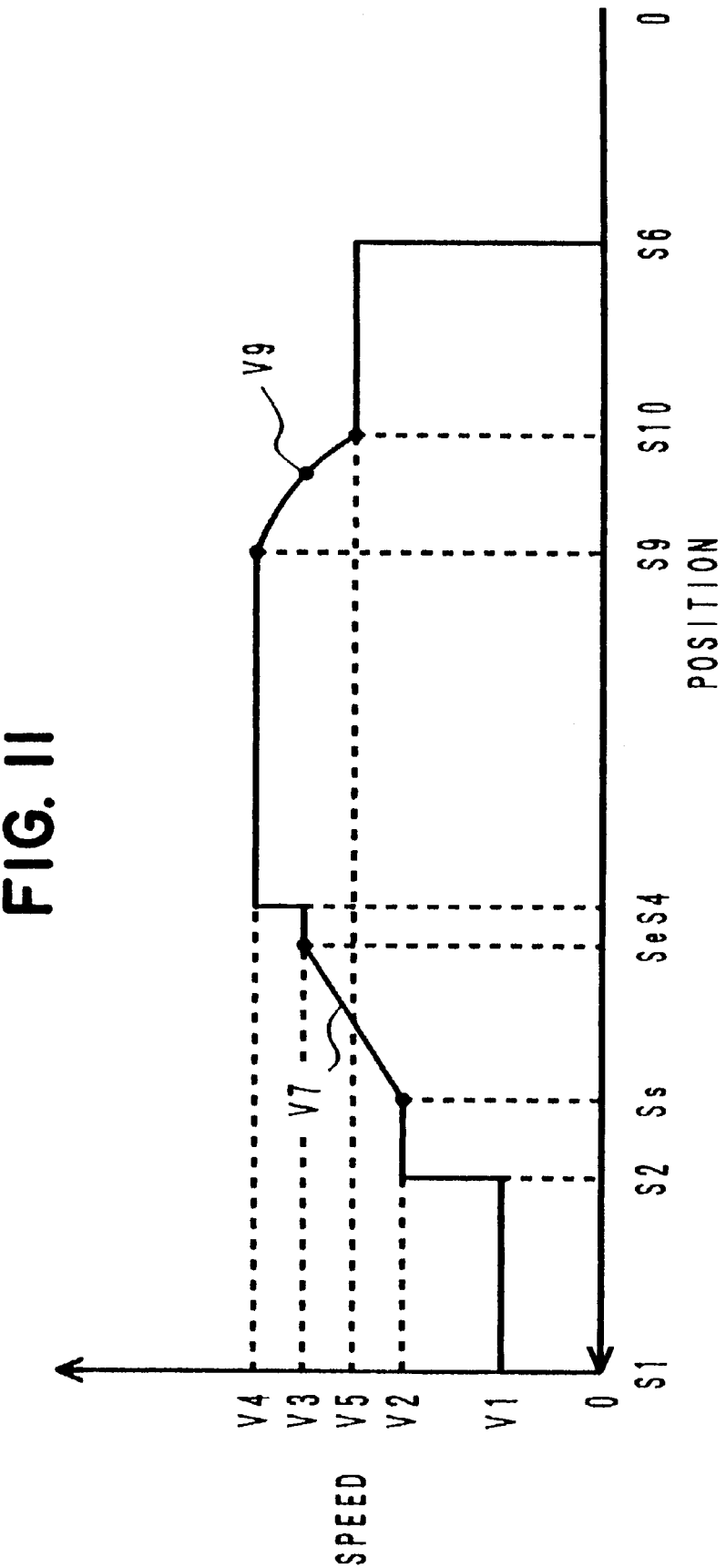

FIG. 12A

| ADDRESS | POSITION | IDENTIFICATION VALUE | DATA |
|---|---|---|---|
| 1 | S1 | D1=0 | V1 |
| 2 | S2 | D2=0 | V2 |
| 3 | S3 | D3=0 | V3 |
| 4 | S4 | D4=0 | V4 |
| 5 | S5 | D5=0 | V5 |
| 6 | S6 | D6=0 | 0 |
| . | . | . | . |
| . | . | . | . |

FIG. 12B

| ADDRESS | POSITION | IDENTIFICATION VALUE | DATA |
|---|---|---|---|
| 1 | S1 | D1=0 | V1 |
| 2 | S2 | D2=0 | $V_s$ |
| 3 | $S_s$ | D3=1 | EQUATION |
| 4 | $S_e$ | D4=0 | $V_e$ |
| 5 | S4 | D5=0 | V4 |
| 6 | S5 | D6=0 | V5 |
| 7 | S6 | D7=0 | 0 |
| . | . | . | . |
| . | . | . | . |

FIG. 12C

| ADDRESS | POSITION | IDENTIFICATION VALUE | DATA |
|---------|----------|----------------------|------|
| 1 | S1 | D1=0 | V1 |
| 2 | S2 | D2=0 | $V_s$ |
| 3 | $S_s$ | D3=1 | EQUATION |
| 4 | $S_e$ | D4=0 | $V_e$ |
| 5 | S5 | D5=0 | V5 |
| 6 | S6 | D6=0 | 0 |
| . | . | . | . |
| . | . | . | . |
| . | . | . | . |

FIG. 12D

| ADDRESS | POSITION | IDENTIFICATION VALUE | DATA |
|---------|----------|----------------------|------|
| 1 | S1 | D1=0 | V1 |
| 2 | S2 | D2=0 | $V_s$ |
| 3 | $S_s$ | D3=1 | EQUATION |
| 4 | $S_e$ | D4=0 | $V_e$ |
| 5 | S6 | D5=0 | 0 |
| . | . | . | . |
| . | . | . | . |
| . | . | . | . |

# 6,066,276

INJECTION SPEED EDITING/SETTING METHOD FOR AN INJECTION MOLDING MACHINE

TECHNICAL FIELD

The present invention relates to a method for editing and setting an injection speed corresponding to the position of an injection screw in an injection molding machine by a display screen and a data input device.

BACKGROUND ART

Conventionally known is an injection molding machine which is designed so that an overall screw movement section is divided into a plurality of subsections, an injection speed is set for each screw movement subsection; and injection operation is controlled to equalize the screw moving speed for each screw movement subsection to the injection speed for each subsection. However, the conventional injection molding machine has a problem in that the screw moving speed within equally divided sections remains constant regardless of the screw position, so that the injection speed changes by stages like a Gauss function, and thus it is hard for the speed to be changed smoothly.

In order for the injection speed to be changed smoothly by setting injection speeds by stages, it is necessary first to divide the screw movement section into considerably smaller subsections and then to assign different injection speeds individually to a number of smaller screw movement subsections obtained by the division, which is an extremely time-consuming task.

SUMMARY OF THE INVENTION

The object of the present invention is to provide an injection speed editing/setting method for an injection molding machine, capable of easily and securely carrying out setting operation which is required for smooth injection speed changing.

In order to achieve the above object, according to one aspect of the present invention, (a) coordinates having two rectangular axes are displayed on a screen, one of the axes representing the position of a screw, the other representing the injection speed; (b) a section from a first screw position to a second screw position, out of an overall movement section of the screw, is defined as a first injection stage; (c) a first injection speed corresponding to the first screw position and a second injection speed corresponding to the second screw position are determined individually; (d) a point representing the relation of the first injection speed and the first screw position and a point representing the relation of the second injection speed and the second screw position are displayed as a starting point and an end point of the first injection stage, respectively, on the rectangular coordinates; (e) a line connecting the starting point and the end point of the first injection stage displayed on the screen is then selected out of a straight line and an arcuate curved line, a straight line connecting the starting point and the end point of the first injection stage is displayed if the straight line is selected, and data for a screw position and corresponding injection speed for giving an intermediate point between the starting point and the end point are inputted, whereby the inputted intermediate point is displayed on the coordinates, and a circular-arc curve connecting the starting point, an intermediate point and the end point are displayed on the coordinates when the circular-arc line is selected; (f) a second injection stage subsequent to the first injection stage, out of the overall movement section of the screw, is defined as a section from the second screw position to a third screw position; (g) the same processings as (c), (d) and (e) are successively executed, thereafter, for the second injection stage and the subsequent injection stages, and the processing for the final injection stage is finished; and (h) the resulting relations of the injection speeds and various screw positions within the overall screw movement section are set and stored in a storage device of a control device of an injection molding machine.

The first screw position and the second screw position of aforesaid (b), as well as the first injection speed and the second injection speed of aforesaid (c), relating to the first injection stage, and the similar screw positions and injection speeds relating to the second and the following injection stages are set through the ten-keys or the cursor on display screen.

According to another aspect of the present invention, for an injection molding machine which is designed to perform injection operation in accordance with an injection speed corresponding to a screw position, a screw movement section is divided into a plurality of subsections; an injection speed is determined for each screw movement subsection; each screw movement subsection and corresponding injection speed are set as injection conditions in a control device; the correlation between each set screw movement subsection and corresponding injection speed is graphically displayed on a display screen; and a starting point and an end point are graphically assigned to set a modification section, the individual screw movement subsections are redefined correspondingly to the modification section; and the shape of a segment connecting the starting point and end point is specified and set as a change characteristic of the injection speed in the modification section.

Preferably, the correlation between the screw position and injection speed or the correlation between the screw position and injection pressure, obtained by performing injection operation under the set injection conditions, along with the correlation between the set screw movement section and injection speed, is graphically displayed on the display screen, thereby enabling the modification section to be set with reference to the data displayed on the screen, the screw movement section to be redefined and the change characteristic of the injection speed to be reset.

According to the present invention arranged in this manner, a subsection (injection stage) from one screw position to another screw position is assigned, and can easily be set by using the display screen so that the injection speed increases or decreases along the oblique straight line or along the circular arc curve.

BRIEF DESCRIPTION OF THE DRAWINGS

FIGS. 10 and 11 are diagrams showing screens set up before and after the execution of the editing/setting processing according to the method of the present invention respectively; and FIG. 12 is a schematic diagram for illustrating modifications of an injection condition setup file in executing the editing/setting processing according to the method of the present invention.

DESCRIPTION OF THE PREFERRED EMBODIMENTS

Figure 1:
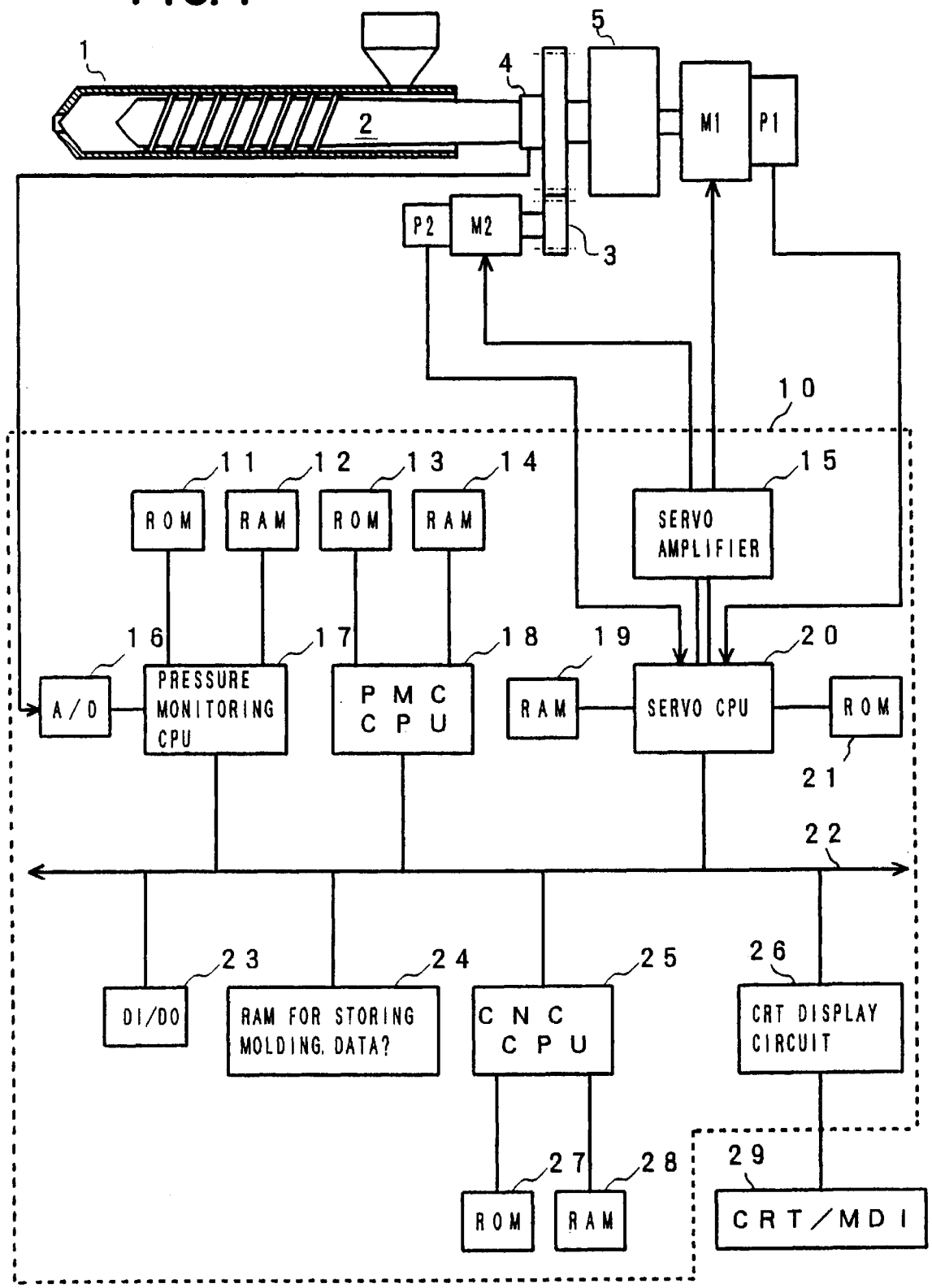
FIG. 1 is a block diagram of a principal part of an injection molding machine to which a method of the present invention is applied and one example of a control device thereof.

An embodiment of the present invention will now be described with reference to the drawings. FIG. 1 is a block diagram showing the principal part of an injection molding machine according to one embodiment to which a method of the present invention is applied. Numerals 1 and 2 denote an injection cylinder and a screw, respectively, of the injection molding machine. The screw 2 is driven in the direction of an injection axis by a servomotor M1 for injection through drive transducer 5 for converting an axial rotation of a drive source into a linear motion in the direction of the injection axis. Also, the screw 2 is rotated for metering by a servomotor M2 for screw rotation through a gear mechanism 3. The proximal portion of the screw 2 so is provided with a pressure sensor 4, whereby resin pressures which act in the axial direction of the screw 2, that is, injection hold pressure for an injection dwell process and screw back pressure for a metering/kneading process, are detected. The injection servomotor M1 is provided with a pulse coder P1 for detecting the position and moving speed of the screw 2, while the screw rotation servomotor M2 is provided with a speed sensor P2 for detecting the rotating speed of the screw 2.

A control device 10 of the injection molding machine comprises a CNCCPU 25 as a microprocessor for computerized numerical control, a PMCCPU 18 as a microprocessor for programmable machine controller, a servo CPU 20 as a microprocessor for servo control, and a pressure monitoring CPU 17 for sampling the injection hold pressure and screw back pressure through an A/D converter 16, so that information can be transferred between the individual microprocessors by mutually selecting their inputs and outputs through a bus 22.

The PMCCPU 18 is connected with a ROM 13, which is stored with a sequence program for controlling the sequence operation of the injection molding machine and the like, and a RAM 14 used for temporary storage of computation data and the like. On the other hand, the CNCCPU 25 is connected with a ROM 27, which is stored with programs for generally controlling the injection molding machine and the like, and a RAM 28 used for temporary storage of computation data and the like.

Moreover, the servo CPU 20 is connected with a ROM 21 loaded with an exclusive control program for servo control and a RAM 19 used for temporary storage of data. The pressure monitoring CPU 17 is connected with a ROM 11, which is loaded with a control program for a sampling process for monitoring the injection hold pressure and screw moving speed, and a RAM 12 used for temporary storage of data.

Further, the servo CPU 20 is connected with a servo amplifier 15 which drives servomotors for various axes for mold clamping, ejector (not shown) operation, injection, screw rotation, etc. in response to commands from the CPU 20. Each of outputs from the pulse coders P1 and P2, which are attached to the injection servomotor M1 and the screw rotation servomotor M2, respectively, is fed back to the servo CPU 20. A present position storage register and a present speed storage register of the memory 19 are stored respectively with the present position of the screw 2, which is computed by the servo CPU 20 in accordance with feedback pulses from the pulse coder P1, the moving speed and the rotating speed of the screw 2, which is detected by the speed sensor P2.

The values of the screw position and screw moving speed for an injection stroke are read successively from the aforesaid present position storage register and present speed storage register synchronously with the injection pressure sampling period, and the values of the screw moving speed and injection pressure for each point of time are written in the RAM 12 on the basis of the screw position, and are retained as sampling data for the last injection stroke.

An interface, 23 is an input/output interface which receives signals from limit switches installed in various parts of the injection molding machine and a control panel and which delivers various commands to peripheral equipment and the like of the molding machine. A manual data input device 29 with display is connected to the bus 22 through a CRT display circuit 26, whereby monitor display screens and function menus can be selected, and various data can be inputted therethrough, and is provided with ten-keys for inputting numerical data and various function keys, etc.

A nonvolatile memory 24 is a memory for storing molding data such as molding conditions (injection condition, metering/kneading condition, etc.) for injection molding operation and various set values, parameters, macro variables, etc.

In the above arrangement, the CNCCPU 25 distributes pulses to the servomotors of the individual axes in accordance with a control program in a ROM 27, while the servo CPU 20 carries out servo control, such as position loop control, speed loop control, current loop control, etc., in the conventional manner, thereby executing the so-called digital servo processing, in accordance with movement commands given to the individual axes by pulse distribution, position and speed feedback signals detected by detectors, such as the pulse coder P1 and the speed sensor P2.

Figure 10:
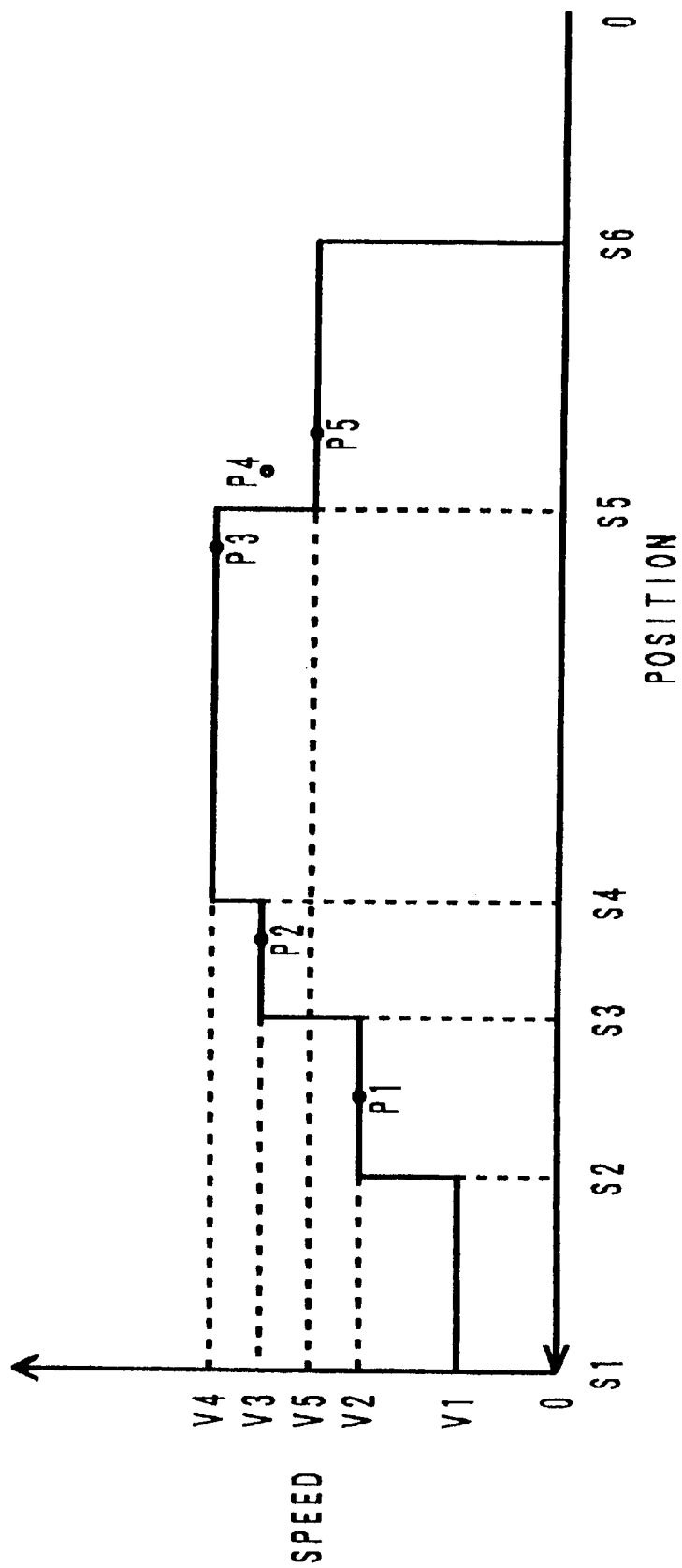

FIG. 12(a) is a schematical diagram showing an injection condition setting file, which is provided in the nonvolatile memory 24 in order to store the correlations between screw movement subsections and injection speeds for the individual screw movement subsections. This injection speed setup file stores the injection speed for a screw movement subsections corresponding to injection speed changeover position, which represents the screw movement subsections. Referring to FIG. 10, an injection speed changeover position, S1 is a metering completion position which is defined when the most advanced screw position is defined as the origin. An injection speed V1 for a first injection stage defined between the injection speed changeover position Si and an injection speed changeover position S2 is stored corresponding to the injection speed changeover position S1, which represents the section concerned. Likewise, injection speeds V1 for i'th injection stage is stored corresponding to injection speed change-over positions Si thereafter. Moreover, the injection condition setting file is provided with fields for "identification values" which provide an information on whether the injection speed V1 is set by initialization or by redefinition, The initial values of identification values Di are all zero.

An operator first empirically sets a plurality of injection speed changeover positions, thereby dividing the screw movement section into a plurality of subsections to determine the number of injection stages. The operator inputs the injection speed changeover positions and the injection speeds for the individual injection stages correspondingly to the control device 10, thereby initializing the injection condition setting file in the same manner as in the conventional case, as shown in FIG. 12(a).

If the injection molding machine is driven to carry out injection molding operation in the above-described manner, the injection speed control will be effected such that the injection speed varies in stages, in the same manner as in the conventional case.

Figure 9:
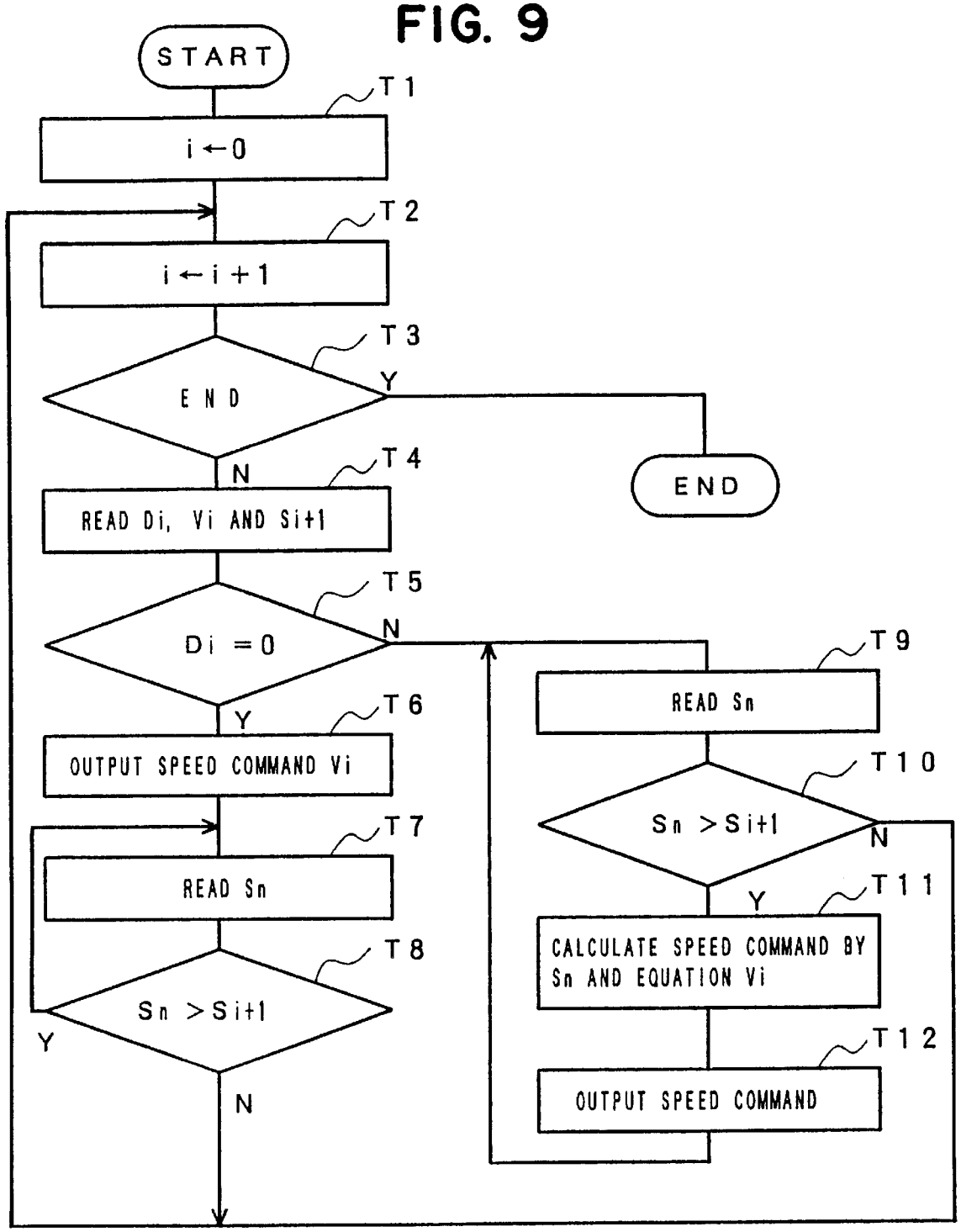
FIG. 9 is a flowchart illustrating an outline of a speed control processing executed by the control device of FIG. 1.

FIG. 9 is a flowchart showing an outline of an injection speed control processing the CNCCPU 25 carries out in response to an injection start command from the PMCCPU 18. After first initializing the value of an address retrieval index i at 0 (Step T1), the CNCCPU 25 increments the value of the index i (Step T2), and determines whether or not the value of the index i is greater than the set number of injection stage (Step T3). If the value of the index i is not greater than the set number injection stage, the CNCCPU 25 reads the identification value Di, the injection speed Vi and the value of an injection speed changeover position Si+1, which is a start position for the next injection stage, from the injection condition setup file (Step T4), and determines whether or not the identification value Di is 0, that is, whether or not the injection speed i for the i'th injection stage is a constant set by initialization (Step T5). In this case, the identification value Di is an initial value, that is, 0 so that the CNCCPU 25 outputs to servo CPU 20 the set injection speed Vi for the i'th injection stage read from the injection condition setup file, as a speed command, and starts drive control of the injection servomotor M1 so that the injection speed equals the set injection speed Vi (Step T6). At this time, moreover, the conventional sampling processing by the pressure monitoring CPU 17 is started, and the respective values of the screw moving speed and the injection pressure are loaded into the RAM 12 with reference to the screw position.

Then, the CNCCPU 25 reads present position Sn of the screw 2 from the present position storage register of the memory 19 (Step T7), and determines whether or not the injection speed changeover position Si+1 as the start position for the next injection stage is reached by the screw 2 (Step T8). If this position is not reached, the processings of Steps T7 and T8 are repeatedly executed thereafter so that the decision in Step T8 becomes No (N), and the injection servomotor M1 is operatively controlled as it is so that the injection speed equals the set injection speed Vi for the i'th injection stage.

If the decision in Step T8 is No, that is, if it is confirmed that the injection speed changeover position Si+1 as the start position for the next injection stage is reached by the screw 2, the CNCCPU 25 proceeds to the processing of Step T2, whereupon it increments the value of the index i. Since all the identification values Di are 0, as mentioned before, the CNCCPU 25 repeatedly executes the same processings as the above until the set number of injection stage is exceeded by the value of the index i, and controls the injection speed for the i'th injection stage in accordance with the value of the index i. In this case, the injection speed is changed in quite the same manner as in the conventional case.

Thus, it is difficult to change the injection speed smoothly, making an appropriate molding operation more difficult for some molded articles.

In such a case, the operator operates the function keys of the manual data input device 29 with display to select a function menu for editing/setting operation. FIGS. 3 to 8 are flowcharts showing an outline of an editing/setting processing to be executed by the PMCCPU 18.

Figure 2:
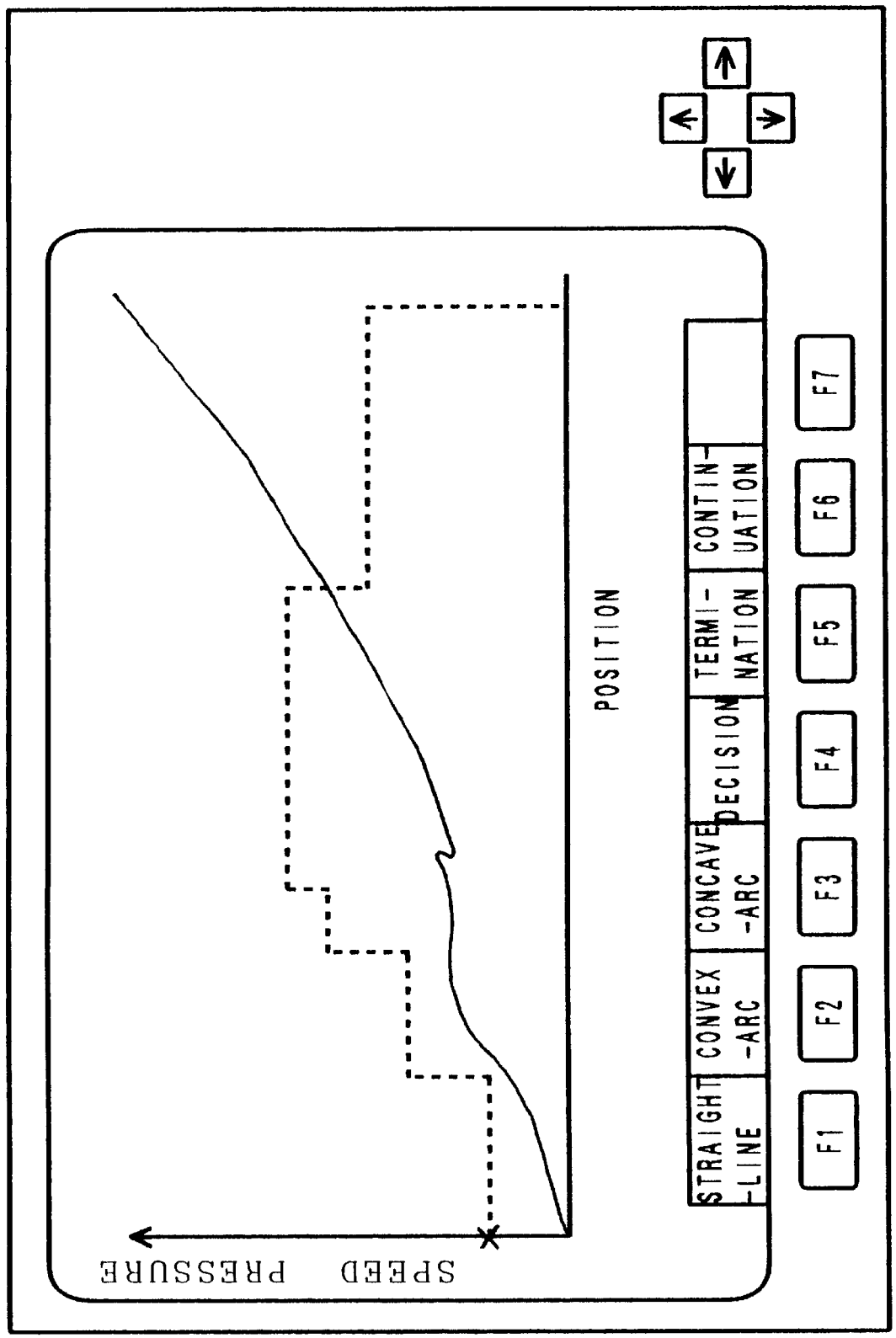
FIG. 2 is a diagram on a display screen showing an example of a setup for an editing/setting process to be executed by the control device of FIG. 1.
Figure 3:
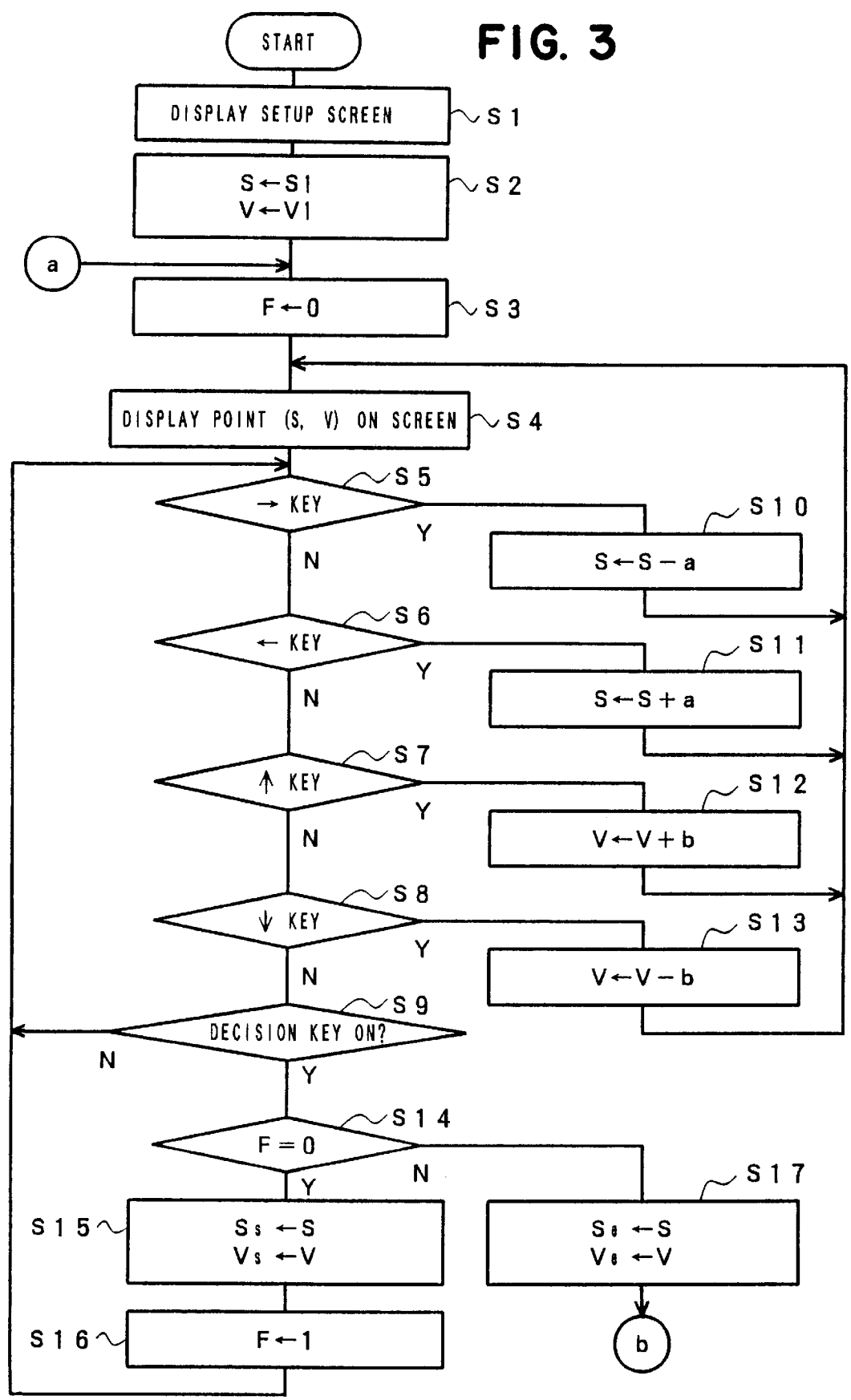
FIGS. 3, 4, 5, 6, 7 and 8 individually show parts of a series of flowcharts illustrating an outline of the editing/setting processing according to the method of the present invention to be executed by the control device of FIG. 1.
Figure 4:
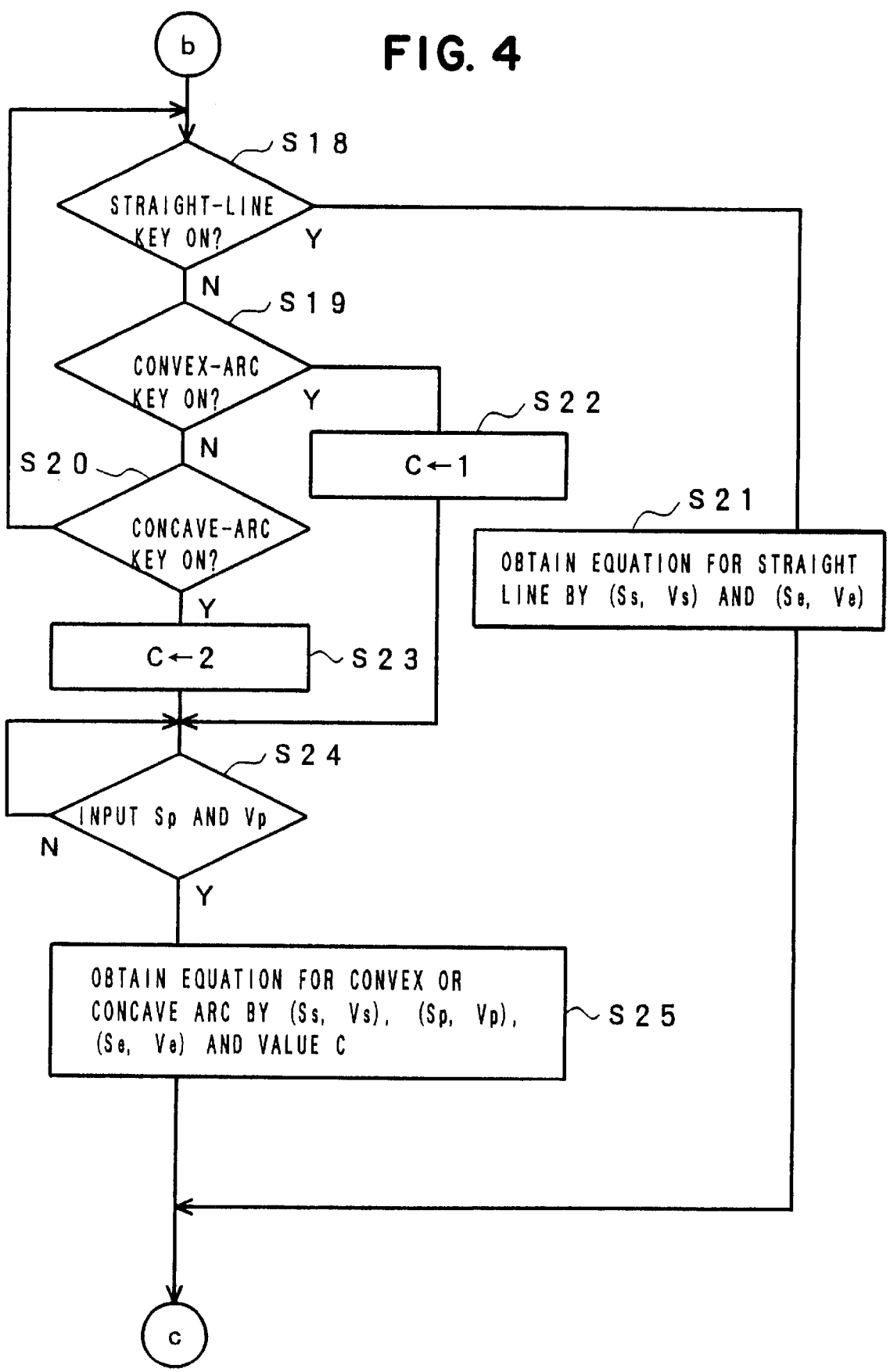
Figure 5:
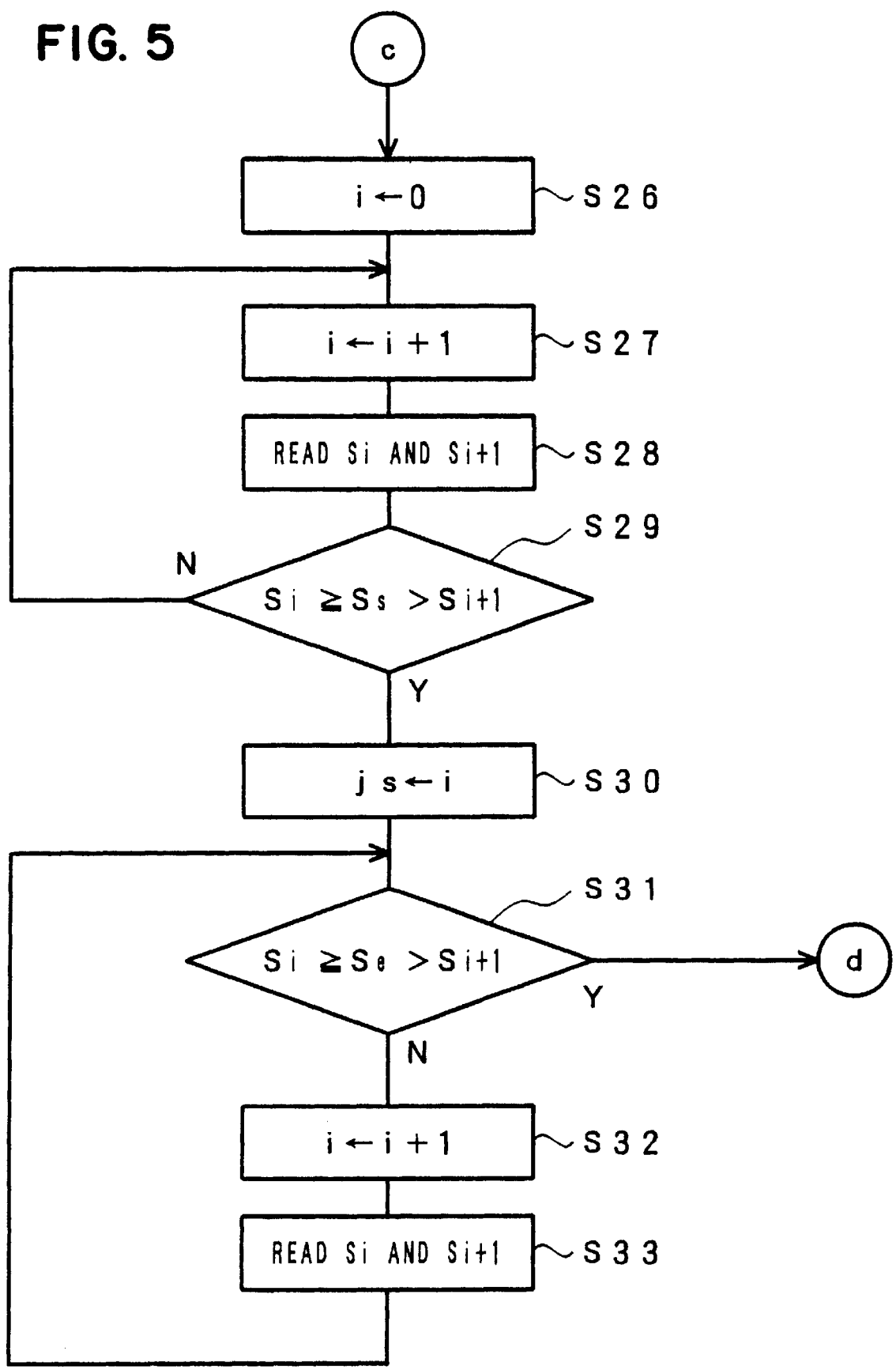
Figure 6:
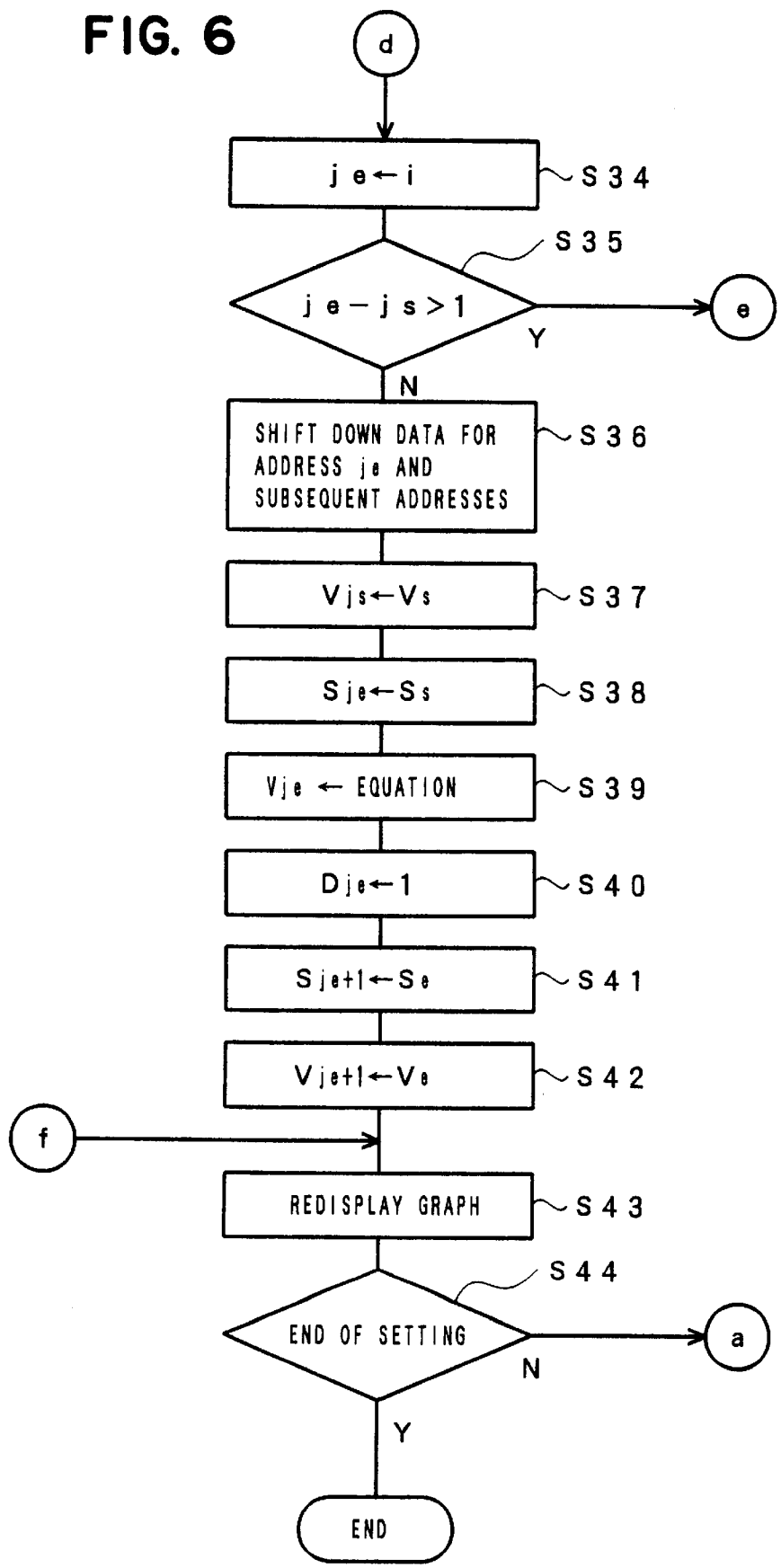
Figure 7:
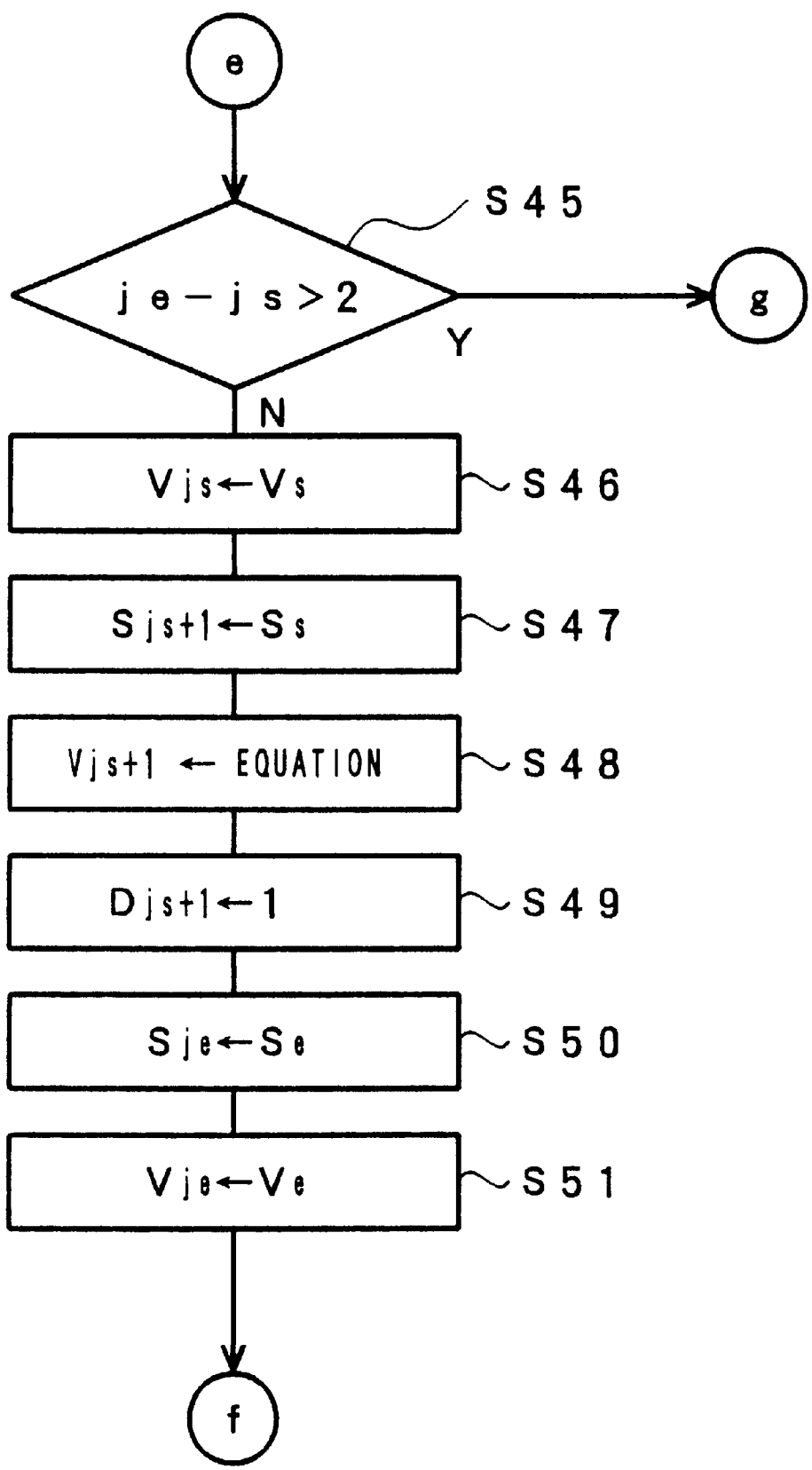
Figure 8:
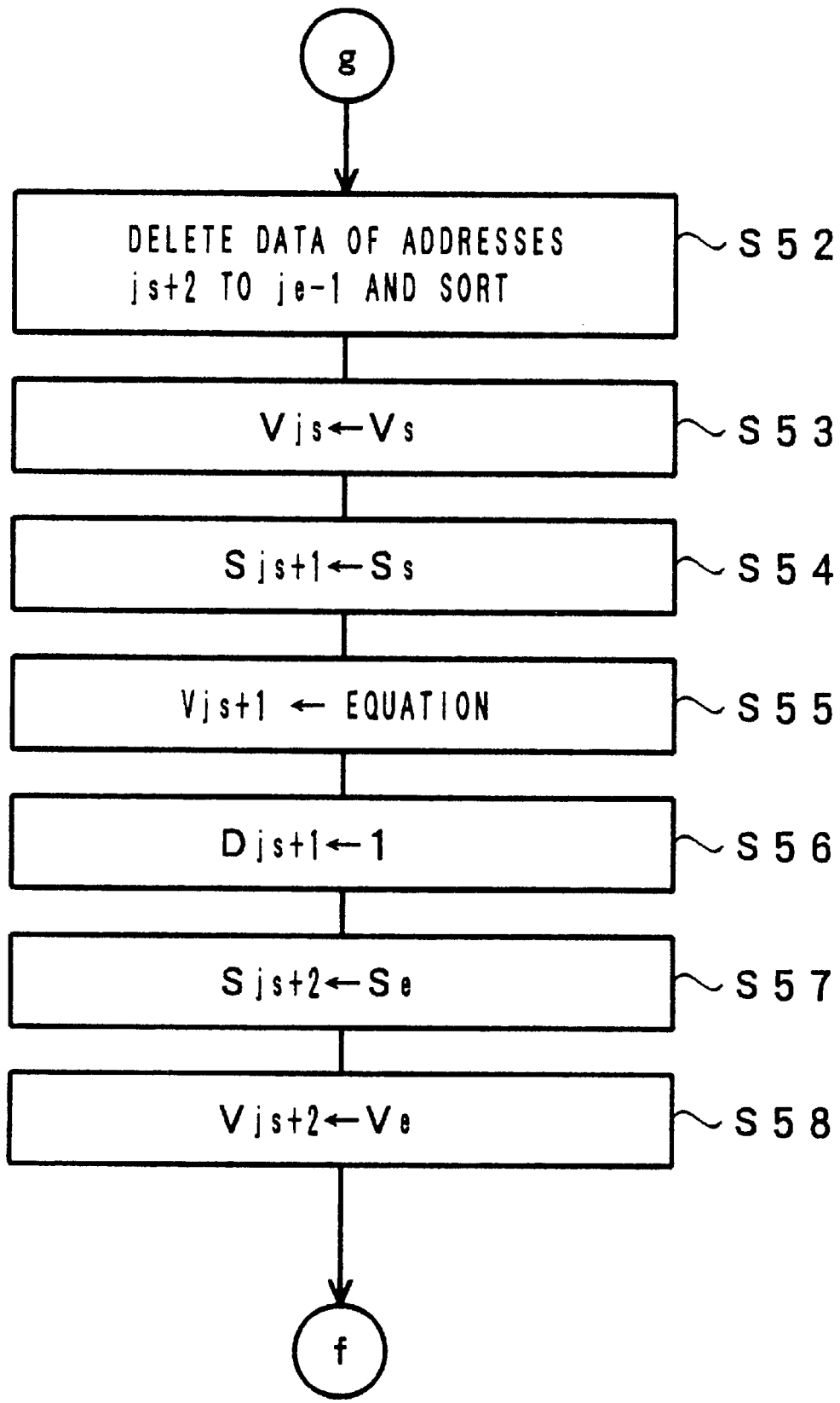

The PMCCPU 18, having started the editing/setting processing in response to the operation of the function keys, first changes the screen of the manual data input device 29 with display over to an edit/setup screen shown in FIG. 2, allocates functions to the function keys F1 to F7, and graphically displays the correlation between the screw movement section and the set injection speed, which are set in the injection condition setting file, on the display screen (Step S1). In the example shown in FIG. 2, in order to facilitate the editing/setting operation, the relation between the data stored in the RAM 12, e.g., the relationship between actual injection pressure and screw position or the relationship between actual screw moving speed and screw position, is also graphically displayed. FIG. 2 shows a case in which the correlation (represented by broken line) between the screw movement section and the set injection speed, set in the injection condition setting file, and the relation (represented by full line) between the actual injection pressure and screw position are graphically displayed.

Then, the PMCCPU 18 reads the values of the injection speed changeover position S1 (metering completion position) and the injection speed V1 from a first address of the injection condition setting file, sets these values as initial values in a position register S and a speed register V (Step 2), and initializes an indication point identification flag F at 0 (Step S3).

Subsequently, the PMCCPU 18 displays a position assigning cursor in a position (S, V) on a graph which represents the correlation between the screw movement section and the set injection speed (Step S4; see FIG. 2), and enters a standby state in which the operation of a cursor-right key, cursor-left key, cursor-up key, cursor-down key, or decision key F4 is awaited (loop processings of Steps S5 to S9).

In the meantime, the operator determines a modification section for smooth speed changeover and the change characteristic of the injection speed for this section with reference to the graph, which represents the correlation between the screw movement section and the set injection speed, and a graph which represents the relation between the actual injection pressure and screw position, determines a starting point position and an end point position of the modification section, and starts starting point assigning operation by the cursor-right key, cursor-left key, cursor-up key, and cursor-down key.

The PMCCPU 18, which repeatedly executes the loop processings of Steps S5 to S9, detects the operation of the cursor-right key, cursor-left key, cursor-up key, or cursor-down key in this discrimination process, and increases or decreases the values in the position register S and the speed register V at predetermined rates a and b in response to the key operation (processes of Steps S10 to S13). Also, the PMCCPU 18 displays the position assigning cursor in the position (S, V), thereby visually indicating position data for the point (S, V), as a candidate for the starting point at the present point of time, for the operator's information (Step S4).

When the operator, having moved the cursor to a desired starting point position, operates the decision key F4, the PMCCPU 18 detects this operation in the discrimination process of Step S9, and determines whether or not its indication point identification flag F maintains its initial value 0 (Step S14). Since the indication point identification flag F is initialized at 0 in the process of Step S3, the decision in Step S14 at this point of time is Yes. Thereupon, the PMCCPU 18 stores a starting point storage register Ss and a starting point speed storage register Vs with the present values in the position register S and the speed register V, respectively (Step S15), and sets 1 for the indication point identification flag F (Step S16).

After setting 1 for the indication point identification flag F, the PMCCPU 18 proceeds to the process of Step S5, whereupon it again enters the standby state in which the operation of any of the various cursor moving keys or the decision key F4 is awaited (loop processes of Steps S5 to S9). Then, the operator operates the various cursor moving keys to move the cursor to a desired end point position in the same manner as aforesaid case (processings of Steps S10 to S13 and Step S4), and operates the decision key F4. After detecting the operation of the decision key F4 in the discrimination process of Step S9, the PMCCPU 18 carries out the discrimination process of Step S14 in the same manner as the aforesaid case. Since 1 is already set for the indication point identification flag F, in this case, the decision in Step S14 is No (N), so that the PMCCPU 18 causes an end point storage register Se and an end point speed storage register Ve to be stored with the present values in the position register S and the speed register V, respectively (Step S17). FIG. 10 shows an example of the starting point position P1(Ss, Vs) of the modification section and an example of the end point position P2(Se, Ve).

When the starting point position and the end point position of the modification section are defined in this manner, the PMCCPU 18 enters a standby state in which the assignment of the shape of a segment which connects the starting point and the end point of the modification section, that is, the change characteristic of the injection speed, is awaited (loop processes of Steps S18 to S20). In this embodiment, a straight line or a circular arc may be selected as the shape of the segment which connects the starting point (Ss, Vs) and the end point (Se, Ve) of the modification section.

When selecting a straight line as the shape of the segment, the operator operates the straight-line key F1, thereby declaring the selection of the straight line upon the control device 10. On detecting the operation of the straight-line key F1 in the discrimination process of Step S18, the PMCCPU 18 obtains an equation for a straight line which connects the starting point (Ss, Vs) and the end point (Se, Ve), and temporarily stores the RAM 14 with this equation (Step S21). This equation is for obtaining the injection speed corresponding to the screw position.

When selecting an upwardly convex circular arc as the shape of the segment, the operator operates the convex-arc key F2. When selecting a downwardly convex circular arc, the operator operates the concave-arc key F3. When the convex-arc key F2 is operated, the PMCCPU 18 detects this in the discrimination process of Step S19, and sets 1 in a convex direction storage register C (Step S22). When the concave-arc key F3 is operated, the PMCCPU 18 detects this in the discrimination process of Step S20, and sets 2 in the convex direction storage register C (Step S23). After finishing the process of Step S22 or S23, the PMCCPU 18 then enters a standby state in which the assignment of a point (Sp, Vp) on circular-arc path is awaited (Step S24). The point (Sp, Vp) on circular-arc path is assigned by keyboard entry through the manual data input device 29 with display or in the same manner as those in the cases of aforesaid processes of Steps S4 to S13. When the arcuate path point (Sp, Vp) is assigned by the operator, the PMCCPU 18 detects this in the discrimination process of Step S24, obtains an equation for an upwardly convex ½ circular arc or a downwardly convex ½ circular arc based on the information for the three points (Ss, Vs), (Sp, Vp) and (Se, Ve) which form the circular arc and the value in the convex direction storage register C, and temporarily stores the RAM 14 with this equation (Step S25). This equation is for obtaining the injection speed corresponding to the screw position. FIG. 10 shows an example of the starting point position P3(Ss, Vs) of the modification section and an example of the end point position P5(Se, Ve).

After obtaining the equation for the straight line or ½ circular arc in this manner, the PMCCPU 18 initializes the value of the address retrieval index i at 0 (Step S26), then increases the value of this index i (Step S27), reads from the injection condition setting file the values of an injection speed changeover position Si as the starting position for the i'th injection stage and injection speed changeover position Si+1 as the start position for the (i+1)'th injection stage (Step S28), and determines whether or not the screw position Ss corresponding to the starting point position of the modification section is within the range $Si \geq Ss > Si+1$, that is, whether or not the starting point position (Ss, Vs) of the modification section belongs to the i'th injection stage of the injection condition setting file (Step S29). If the starting point position (Ss, Vs) of the modification section does not belong to the i'th injection stage, the PMCCPU 18 successively increases the value of the index i and repeatedly executes the same processes as are described previously until the i'th injection stage to which the starting point position (Ss, Vs) of the modification section belongs is detected. By doing this, the PMCCPU 18 detects the injection stage to which the starting point position (Ss, Vs) of the modification section belongs, and stores a starting injection stage storage register is with the value of the index i at this point of time (Step S30).

The PMCCPU 18 further executes the same processes as described previously for the screw position Se corresponding to the end point position of the modification section, thereby detecting the injection stage to which the end point position (Se, Ve) of the modification section belongs (Steps S31 to S33), and stores an end point injection stage storage register je with the value of the index i at this point of time (Step S34). In the case of the example of the starting point position P1(Ss, Vs) and the example of the end point position P2(Se, Ve) shown in FIG. 10, js=2 and je=3 are given.

After detecting the injection stage is to which the start point position (Se, Ve) of the modification section belongs and the injection stage je to which the end point position (Se, Ve) belongs in this manner, the PMCCPU 18 separately carries out the processes of Steps S36 to S42, Steps S46 to S51, or Steps S52 to S58, depending on whether or not the difference between js and je is not greater than 1 (Step S35), or greater than 1 and not greater than 2, or greater than 2 (Step S45).

First, in the case where the difference between js and je is 1, so that the decision in Step S35 is No (N), that is, in the case where the injection stage is to which the starting point position (Ss, Vs) belongs and the injection stage je to which the end point position (Se, Ve) belongs are adjacent to each other, the injection stage of the modification section defined by the starting point position (Ss, Vs) and the end point position (Se, Ve) is newly inserted between the injection stages is and je, so that the number of injection stages of the injection condition setting file needs to be increased by one as a whole.

Thereupon, the PMCCPU 18 causes data for a je'th address and subsequent addresses of the injection condition setting file to be shifted downward by one address at a time, and provides the storage region of the je'th address of the injection condition setting file with a free region for storing information for the modification section (Step S36).

Then, by setting an injection speed Vs in the starting point position (Ss, Vs) of the modification section as an injection speed Vjs for a js'th injection stage to which the starting point position (Ss, Vs) of the modification section belongs, the injection speed Vs in the starting point position (Ss, Vs) for the je'th injection stage newly set as the modification section is made to be equal to the injection speed at the end of the js'th injection stage (Step S37).

Further, the screw position Ss corresponding to the starting point position (Ss, Vs) of the modification section is set as an injection speed changeover position Sje for the newly set je'th injection stage (Step S38), the equation for the straight line or ½ circular arc obtained in the processings of Step S21 or S25 is set as an injection speed Vje for the section concerned (Step S39), and the value 1, which indicates that the injection speed is set according to the equation, is set as an identification value Dje for the je'th address (Step S40).

Then, the screw position Se corresponding to the end point position (Se, Ve) of the modification section is set as an injection speed changeover position Sje+1 for a (je+1)'th injection stage situated next to the modification section (Step S41). By setting an injection speed Ve corresponding to the end point position (Se, Ve) of the modification section as an injection speed Vje+1 for the (je+1)'th injection stage, moreover, the injection speed Ve in the end point position (Se, Ve) for the je'th injection stage newly set as the modification section is made to be equal to the injection speed at the start of the (je+1)'th injection stage (Step S42).

FIGS. 12(b) and 11 show a state of a modified injection condition file and a state of a graph based on the modified injection condition file, in the case where the modification section is defined by assigning the starting point position (Ss, Vs) and the end point position (Se, Ve) under the conditions shown in FIGS. 12(a) and 10. However, note that the result of the modification is not shown in the file of FIG. 12(b), since the modification by defining the section to be modified with a starting point position P3, an end point position P5, and a position P4 of a point on a circular-arc path has not yet actually been started at this point, but the result of such modification is illustrated in FIG. 11. V7 in FIG. 11 indicates a straight line represented by an equation for a third address in FIG. 12(b). In this example, the starting point position P1 and the end point position P2 are assigned along the graph of FIG. 10, so that data of FIG. 12(b) are given by Vs=V2 and Ve=V3.

Also in the case where the modification section is defined by the starting point position P3, end point position P5, and arcuate path point position P4, the starting point position P3 and the end point position P5 are situated in adjacent injection stages, so that the flow of processing is quite the same as described above. Thus, if the aforesaid processing operation is carried out once again by assigning the end point position P5 and the arcuate path point position P4, an injection stage from a screw position S9 to a screw position S10 in FIG. 11 is further inserted as the modification section, and an injection speed changeover position for the final injection stage shifts from a screw position S5 of FIG. 10 to a screw position S10 of FIG. 11. V9 in FIG. 11 indicates an upwardly convex circular arc which passes P3, P4 and P5.

In the case where the difference between the injection stage js to which the starting point position (Ss, Vs) of the modification section belongs and the injection stage je to which the end point position (Se, Ve) belongs is 2 and the decisions in Steps S35 and S45 are Yes (Y) and No (N), respectively, that is, in the case where another injection stage is inserted between the injection stage js to which the starting point position (Ss, Vs) belongs and the injection stage je to which the end point position (Se, Ve) belongs, the number of injection stages of the injection condition setting file itself will remain unchanged.

In this case, the PMCCPU 18 sets the injection speed Vs in the starting point position (Ss, Vs) of the modification section as the injection speed Vjs for the js'th injection stage to which the starting point position (Ss, Vs) of the modification section belongs, thereby making the injection speed Vs in the starting point position (Ss, Vs) for a (js+1)'th injection stage newly set as the modification section and the injection speed at the end of the js'th injection stage equal to each other (Step S46).

Further, the screw position Ss corresponding to the starting point position (Ss, Vs) of the modification section is set as an injection speed changeover position Sjs+1 for the newly set (js+1)'th injection stage (Step S47); the equation for the straight line or ½ circular arc obtained in the process of Step S21 or S25 is set as an injection speed Vjs+1 for the section concerned (Step S48); and the value 1, which indicates that the injection speed is set according to the equation, is set as an identification value Djs+1 for the (js+1)'th address (Step S49).

Then, the screw position Se corresponding to the end point position (Se, Ve) of the modification section is set as an injection speed changeover position Sje for the je'th injection stage situated next to the modification section (Step S50). By setting the injection speed Ve corresponding to the end point position (Se, Ve) of the modification section as the injection speed Vje for the je'th injection stage, moreover, the injection speed Ve in the end point position (Se, Ve) for the (js+1)'th injection stage newly set as the modification section is made to be equal to the injection speed at the start of the je'th injection stage (Step S51).

FIG. 12(c) shows a state of a modified injection condition file in the case where the modification section is defined by assigning the starting point position (Ss, Vs) situated in a second injection stage and the end point position (Se, Ve) situated in a fourth injection stage under the conditions shown in FIG. 12(a).

In the case where the difference between the injection stage is, to which the starting point position (Ss, Vs) of the modification section belongs, and the injection stage je, to which the end point position (Se, Ve) belongs, is 3 or more, and the decisions in Steps S35 and S45 are both Yes (Y), that is, in the case where two other injection stages or more are inserted between the injection stage is, to which the starting point position (Ss, Vs) belongs and the injection stage je, to which the end point position (Se, Ve) belongs, the injection stages from the injection stage is to the injection stage je can be replaced with three injection stages as a whole without regard to the number of stages.

In this case, the PMCCPU 18 deletes the data corresponding to the addresses js+2 to je−1 in the injection condition file and executes sorting processing for filling the blank so that the storage region of the address js+1 in the injection condition file can be used for setting modification section (Step S52).

Then, the PMCCPU 18 sets the injection speed Vs in the starting point position (Ss, Vs) of the modification section as the injection speed Vjs for the js'th injection stage to which the starting point position (Ss, Vs) of the modification section belongs, thereby making the injection speed Vs in the starting point position (Ss, Vs) for the (js+1)'th injection stage newly set as the modification section and the injection speed at the end of the js'th injection stage equal to each other (Step S53).

Further, the screw position Ss corresponding to the starting point position (Ss, Vs) of the modification section is set as the injection speed changeover position Sjs+1 for the newly set (js+1)'th injection stage (Step S54); the equation for the straight line or ½ circular arc obtained in the process of Step S21 or S25 is set as the injection speed Vjs+1 for the section concerned (Step S55), and the value 1, which indicates that the injection speed is set according to the equation, is set as the identification value Djs+1 for the (js+1)'th address (Step S56).

Then, the screw position Se corresponding to the end point position (Se, Ve) of the modification section is set as an injection speed changeover position Sjs+2 for a (js+2)'th injection stage situated next to the modification section (Step S57). By setting the injection speed Ve corresponding to the end point position (Se, Ve) of the modification section as an injection speed Vjs+2 for the (js+2)'th injection stage, moreover, the injection speed Ve at the end point position (Se, Ve) for the (js+1)'th injection stage newly set as the modification section is made to be equal to the injection speed at the start of the (js+2)'th injection stage (Step S58).

FIG. 12(d) shows a state of a modified injection condition file in the case where the modification section is defined by assigning the starting point position (Ss, Vs) situated in the second injection stage and the end point position (Se, Ve) situated in a fifth injection stage under the conditions shown in FIG. 12(a). In this case, third and fourth injection stages of FIG. 12(a) is replaced with a third injection stage of FIG. 12(d).

After thus modifying the injection condition file by the processings of Steps S36 to S42, Steps S46 to S51, or Steps S52 to S58, the PMCCPU 18 graphically displays the correlation between the screw movement section and the set injection speed on the screen of the manual data input device 29 with display, in accordance with set data of the modified injection condition file, thereby showing the contents of modification to the operator (Step S43; see FIG. 11), and stands by until the operator operates a termination key F5 or a continuation key F6 (Step S44).

When the continuation key F6 is operated, the injection condition file is modified by repeatedly executing the same processes as described previously again in response to the operator's operation, and enters a standby state in which the operation of the termination key F5 or the continuation key F6 is awaited. When the termination key F5 is operated finally, the PMCCPU 18 finishes the editing/setting process, and proceeds to another process.

The control of the injection speed based on the set conditions of the modified injection condition storage file is carried out in the following manner in accordance with the injection speed control process shown in FIG. 9.

First, the CNCCPU 25, having received the injection start command from the PMCCPU 18, initializes the value of the address retrieval index i at 0 (Step Ti), then increments the value of the index i (Step T2), and determines whether or not the value of the index i is greater than the set number of injection stages (Step T3). If the value of the index i is not greater than the set number of injection stages, the CNCCPU 25 reads the identification value Di, injection speed data Vi, and the value of the injection speed changeover position Si+1 as the start position for the next injection stage from the injection condition setting file (Step T4). The CNCCPUAS discriminates whether or not the identification value Di is 0, that is, whether the injection speed data Vi for the i'th injection stage is the constant set by initialization or the equation set in the aforementioned editing/setting processing (Step T5). In the case where the identification value Di is 0, that is, in the case where the injection speed data Vi is the constant, quite the same processes as the conventional ones are to be executed, Since these processings have already been described in connection with the present embodiment, their descriptions will be omitted here (see Steps T6 to T8).

In the case where the identification value Di is 1, that is, in executing injection control for the modification section set in the editing/setting process, the CNCCPU 25 reads the present position Sn of the screw 2 successively from the present position storage register of the memory 19 (Step T9). In addition, the CNCCPU 25 determines on each occasion whether or not the injection speed changeover position Si+1 as the start position for the next injection stage is reached by the screw 2 (Step T10). If the injection speed changeover position Si+1 as the start position for the next injection stage is not reached by the screw 2, the value of the present position Sn read in the process of Step T9 is substituted for the equation set as the injection speed data Vi, Then, this equation is solved to obtain the value of the injection speed corresponding to the present screw position Sn (Step T11), whereby a speed command corresponding to this can be delivered to the servo CPU 20 to control the drive of the injection servomotor M1 (Step T12).

Thereafter, until the present screw position Sn reaches the injection speed changeover position Si+1, which is to be the start position for the next injection stage, the CNCCPU 25 repeatedly executes the processes of Steps T9 to T12, and controls the drive of the injection servomotor M1 so that the injection speed changes according to the equation set as the injection speed data Vi.

If it is detected in the discrimination process of Step T1O that the injection speed changeover position Si+1 is reached by the present screw position Sn, the CNCCPU 25 proceeds again to the process of Step T2, whereupon it increments the value of the index i. Thereafter, until the value of the index i exceeds the set number of injection stages, the CNCCPU 25 repeatedly executes the speed control processes of Steps T6 to T8 or Steps T9 to T12 with every injection stage in accordance with the respective values of the index i and the identification value Di.

If satisfactory moldings cannot be obtained despite the injection control based on the set conditions of the modified injection condition storage file, the data of the injection condition setting file can be modified by repeatedly executing the editing/setting process again in the same manner as described previously.

Alternatively, the injection condition setting file set by initialization may be retained as it is without being modified, and the data of the injection condition setting file may be reproduced on another file before the editing/setting process is started so that data modifying operation based on the editing/setting process can be performed for the reproduced injection condition setup file. In this case, the data to be used in the injection speed control processings and the editing/setting processings in the second and subsequent cycles are read by specifying either the initially set injection condition setup file or the modified injection condition setup file. This operation is useful in the case where speed setting for the injection control requires restoration of the initial state.

Described above is an embodiment in which the change characteristic of the injection speed for the modification section is defined by the straight line or circular arc.

Alternatively, however, the change characteristic of the injection speed for the modification section may be defined by using a curved line, such as a parabola or hyperbola. More specifically, the screw position in the modification section is defined only by two points which determine the starting point and end point of the modification section. All the speeds in the modification section are determined by solving an equation including the present screw position as its variable, so that, even if the change characteristic is a complicated one based on, for example, a parabola or hyperbola, the speed control for the modification section can be effected in the same manner as in the present embodiment as long as the change characteristic can be defined by a functional equation.

According to the injection speed editing/setting method of the present invention, as described above, the correlation between the initially set screw movement section and injection speed is graphically displayed on the display screen. A new modification section is set by assigning the starting point and end point on the graph, and the change characteristic of the injection speed for the modification section can optionally be set by assigning the shape of a segment which connects the starting point and end point of the section. Accordingly, the change characteristic of the injection speed can freely be set without setting the injection speed by subdividing the screw movement section. The necessary injection speed change characteristic can be set with ease even in the case where the injection control requires the injection speed to be changed smoothly. Since the correlation between the screw position and injection speed or the correlation between the screw position and injection pressure, obtained by performing injection operation under set injection conditions, can be displayed graphically on the display screen so that the setting operation can be carried out with reference to it, the modification section and the injection speed change characteristic can be accurately set again, in view of deficiencies of the set injection conditions.

The above-described embodiment represents a case in which the relationship between the screw position and injection speed is modified into the one shown in FIG. 11 by assigning the starting point P1 and the end point P2 of the first modification section and the starting point P3 and the end point P5 of the second modification section on straight lines which represent the previously set relationship between the screw position and injection speed, as shown in FIG. 10. However, the present invention can be applied not only for modifying the previously set relationship, but also for newly establishing the relationship between the screw position and injection speed.

More particularly, in a case such that the relationship between the screw position and injection speed shown in FIG. 11 is required from the beginning, the injection speed for the first injection stage can be determined by assigning points (Si, V1) and (S2, V1) on the rectangular coordinates of FIG. 11 and by connecting the two points with a straight line. Also in the case of the third injection stage, it is necessary only that the points (Ss, Vs) and (Se, Ve) be assigned and connected with a straight line. The injection speed for other injection stages can also be determined in like manner.

We claim:

1. An injection speed editing/setting method for an injection molding machine, comprising the steps of:

(a) displaying coordinates having two rectangular axes on a screen, one of the axes representing the position of a screw, the other representing the injection speed;

(b) defining, as a first injection stage, a section from a first screw position to a second screw position, out of an overall movement section of the screw;

(c) setting a first injection speed corresponding to said first screw position and a second injection speed corresponding to said second screw position;

(d) displaying a point indicative of the relation of the first injection speed to said first screw position and a point indicative of the relation of the second injection speed to said second screw position as a starting point and an end point of the first injection stage, respectively, on said rectangular coordinates;

(e) selecting by a user one of a straight line and an arcuate curved line to connect the starting point and the end point of said first injection stage displayed on the screen, when the straight line is selected, displaying a straight line connecting the starting point and end point of said first injection stage, when the arcuate curved line is selected, further inputting, data using a data input device, on a screw position and a corresponding injection speed for giving an intermediate point between said starting point and end point, displaying the inputted intermediate point on said coordinates, and displaying a circular-arc line connecting said starting point, intermediate point and the end point on the coordinates, (f) further defining a second injection stage subsequent to said first injection stage, out of said overall movement section of the screw, as a section from said second screw position to a third screw position;

(g) successively executing the processing for the second and following injection stages in the same fashion as those for said steps (c), (d) and (e) until finishing the processing for the last injection stage, and (h) setting and storing the resulting relation of the injection speed to each screw position in the overall screw movement section in a storage device of a control device of the injection molding machine.

2. An injection speed editing/setting method for an injection molding machine according to claim 1, wherein the first screw position and the second screw position of said step (b) for the first injection stage, the first injection speed and said second injection speed of said step (c), and similar screw positions and injection speeds for the second injection stage and the following injection stages are inputted individually by using ten-keys of the data input device.

3. An injection speed editing/setting method for an injection molding machine according to claim 1, wherein the first screw position and the second screw position of said step (b) for the first injection stage, the first injection speed and said second injection speed of said step (c), and similar screw positions and injection speeds for the second injection stage and the following injection stages are set individually by using a cursor on the screen.

4. An injection speed editing/setting method for an injection molding machine according to claim 1, wherein data for the intermediate point of said step (e2) is inputted by using ten-keys of the data input device.

5. An injection speed editing/setting method for an injection molding machine according to claim 1, wherein data for the intermediate point of said step e2 is set by using a cursor on the screen.

6. An injection speed editing/setting method for an injection molding machine, comprising the steps of:

(a) dividing an overall screw movement section into n screw movement subsections, wherein n is an integer with a value of greater than 1;

(b) setting an injection speed represented by velocities V1 through Vn for each of the n screw movement subsections from first through n-th screw movement subsection, and storing the injection speed for each of the n screw movement subsections in a controller as an injection condition;

(c) displaying a rectangular coordinate system on a display screen connected to the controller, and also displaying said injection condition on the display screen, set in the above step (b), in accordance with said displayed rectangle coordinate in the form of a graph, wherein one axis of said rectangular coordinate system represents a screw position and another axis represents an injection speed;

(d) moving a cursor on the display screen to a point on a straight line which represents an injection speed of a velocity Vj for the j-th screw movement subsection, and designating that point as the first point, wherein $1 \leq j \leq n$;

(e) moving a cursor to a point on the straight line which represents an injection speed of a velocity Vk for the k-th screw movement subsection, and designating that point as the second point, wherein $1 \leq k \leq n$ and $j<K$;

(f) selecting a straight line or a curved line to connect said first point to said second point; and (g) causing said controller to modify the end point of the j-th screw movement subsection to the screw position corresponding to said the first point on the basis of designation in said steps (d) and (e) and selected in said step (f), setting a section from the screw position corresponding to said first point to the screw position corresponding to said second point as the j+l-th screw movement subsection, changing the k-th screw movement subsection and the subsequent screw movement subsections to the K+2-th screw movement subsection to the screw position corresponding to said second point.

7. An injection speed editing/setting method according to claim 6, wherein said selecting of a curved line in said step (f) comprises specifying of the first point and the second point and further comprises independently selecting a third point as an intermediate point between the first and second point, and determining a circular arc which passes through the first, and the second and the third points, as said curved line.

8. An injection speed editing/setting method according to claim 6, wherein, when designating said first and second points in steps (d) and (e) on the display screen, an injection pressure curve with respect to screw position is also displayed on said screen in addition to said rectangular coordinate system displayed in step (c).

9. An injection speed editing/setting method for an injection molding machine, comprising the steps of:

(a) dividing an overall screw movement section into n screw movement subsections, wherein n is an integer with a value of greater than 1;

(b) setting an injection speed represented by velocities V1 through Vn for each of the n screw movement subsections from first through n-th screw movement subsection, and storing the injection speed for each of the n screw movement subsections in a controller as an injection condition;

(c) displaying a rectangular coordinate system on a display screen connected to the controller, and also displaying said injection condition on the display screen, set in the above step (b), in accordance with said displayed rectangle coordinate in the form of a graph, wherein one axis of said rectangular coordinate system represents a screw position and another axis represents an injection speed;

(d) moving a cursor on the display screen to a first point on a straight line which represents an injection speed of a velocity Vj for the j-th screw movement subsection, and designating that point as the first point, wherein $1 \leq j \leq n$;

(e) moving the cursor on the display screen to a second point on the straight line which represents an injection speed of a velocity Vk for the k-th screw movement subsection, and designating that point as the second point, wherein $1 \leq k \leq n$ and $j<K$;

(f) moving the cursor on the display screen to a third point which is between the first point and the second point on the graph;

(g) selecting a curved line to connect the first point to the third point and the third point to the second point;

(h) modifying the end point of the j-th screw movement subsection to the screw position corresponding to said the first point on the basis of designation in said steps (d) and (e) and selected in said step (g);

(i) setting a section from the screw position corresponding to said first point to the screw position corresponding to said second point as the j+1-th screw movement subsection;

(k) changing the k-th screw movement subsection and the subsequent screw movement subsections to the J+2-th screw movement subsection to the screw position corresponding to the second point; and (l) displaying an injection pressure curve with respect to screw position on the same screen with rectangular coordinate system displayed in step (c) after designating the first point, the second point and the third point designated in steps (d), (e) and (f) on the display screen.

* * * * *

UNITED STATES PATENT AND TRADEMARK OFFICE
CERTIFICATE OF CORRECTION

PATENT NO.    : 6,066,276
DATED         : May 23, 2000
INVENTOR(S)   : Kamiguchi et al.

It is certified that error appears in the above-identified patent and that said Letters Patent is hereby corrected as shown below:

Title page:
Item [75] change "Oshino-mura" to Minamitsuru--.

Column 4,
Line 50, change "Si" to S1--;
Line 58, change "V1" to --Vi--;
Line 59, change "," to --.--.

Column 8,
Line 29, change "is" to --js--;
Line 42, change "is" to --js--;
Line 53, change "is" to --js--; and
Line 59, change "is" to --js--.

Column 10,
Line 44, change "is" to --js--;
Line 49, change "is" to --js--;and
Line 52, change "is" to --js--;

UNITED STATES PATENT AND TRADEMARK OFFICE
CERTIFICATE OF CORRECTION

PATENT NO. : 6,066,276
DATED : May 23, 2000
INVENTOR(S) : Kamiguchi et al.

It is certified that error appears in the above-identified patent and that said Letters Patent is hereby corrected as shown below:

Column 11,
Line 57, change "T:" to --Ta--; and
Line 65, change "CNCCPUAS: to --CNCCPU 25--.

Column 12,
Line 6, change "," to --.--;
Line 22, change "," to --.--; and
Line 35, change "T10" to --T1D--.

Column 14,
Line 17, insert --(ed)-- before "when"; and
Line 20, --(e2)--before "when".

Signed and Sealed this

Seventh Day of August, 2001

*Attest:*

*Attesting Officer*

NICHOLAS P. GODICI
*Acting Director of the United States Patent and Trademark Office*